United States Patent Office 2,711,972
Patented June 28, 1955

2,711,972

PRODUCTION OF CORROSION RESISTANT COATINGS ON METAL STRUCTURES

William T. Miller, Ithaca, and Abraham D. Kirshenbaum, New York, N. Y., assignors to the United States of America as represented by the United States Atomic Energy Commission No Drawing. Application July 11, 1946, Serial No. 682,936

14 Claims. (Cl. 117—62)

This invention relates to a method of forming on a metal structure a coating resistance to corrosion by halogens and metal halides, and particularly by uranium hexafluoride; and to an article comprising a metal structure bonded to such a coating.

A process has been developed for enriching uranium hexafluoride with respect to uranium 235, a source of atomic energy. In this process uranium hexafluoride in the form of a gas, is separated into its isotopic species, $U^{235}F_6$ and $U^{238}F_6$, by diffusion through porous, permeable membranes.

In a plant for carrying on this process, it is important that the equipment should be resistant to corrosion by the uranium hexafluoride gas. Corrosion is destructive to the equipment and consumes the exceedingly valuable enriched compound. Corrosion may also produce reaction products suspended as dusts in the gas, which may plug the pores of the membranes and impair their efficiency. However, the ordinary metals of construction are seriously corroded by uranium hexafluoride.

It is therefore among the objects of the invention to provide an article and method of making an article comprising a metal structure having a coating resistant to corrosion by uranium hexafluoride and by halogens and metal halides in general. It is an object of the invention that the coating should be flexible, firmly adherent to the metal, and sufficiently uniform in composition to afford uniform protection.

According to the present invention, these objects may be achieved by providing on a metal structure a film of a natural or synthetic polymer and treating the polymer in situ with fluorine, under suitable conditions. Among the polymers that may be used are elastomers such as natural rubber, butyl rubber, "Buna-N" (essentially a co-polymer of butadiene and acrylonitrile) and chloroprene; polystyrene; polyvinyl alcohol-aldehyde co-polymers sold under the trade-name "Formvar"; and polymerized fluorine containing compounds such as polyperfluorobutadiene, the fluorine analog of polybutadiene. Preferred polymers are polystyrene, "Buna-N," polyperfluorobutadiene and those of the "Formvar" type. Metal structures which may be coated by the method of the present invention are, for example, of steel, brass, copper and nickel. Particularly useful coatings have been obtained by treating polystyrene films in situ on steel, brass and copper structures respectively with fluorine; "Buna-N" on copper; polyperfluorobutadiene on copper and steel; and resins of the "Formvar" type on nickel. The invention is applicable in the manufacture of many types of equipment for a uranium hexafluoride gas plant; for example the interior of metal pipes for conducting the gas, or electrical leads of vacuum pumps for pumping the gas, may be treated by the present method. The polymer film may be formed on the metal surface, for example by dissolving the polymer in a solvent, applying the solution to the metal surface and permitting the solvent to evaporate to leave a dry film. Application may be by brushing, flowing, dipping or spraying. Alternatively, particularly when the polymer is difficult to dissolve, it may be melted and the melt applied to the metal surface by any of the techniques mentioned. If desired, the film may be formed on a separate surface, then taken off and placed on the metal surface. The polymer film may be treated in situ with fluorine by means of a continuous flow system or a static system. In some cases it is desirable to use a continuous flow system and maintain the film in good heat transfer relation with a cooling medium during the reaction; or advantageously, a suitable preliminary treatment of this type may be carried out, and a relatively longer static fluorination of a large bulk under conditions of relatively poor heat transfer may then be safely carried out. In making relatively thick coatings it is desirable to build up the coating in layers, each layer being fluorinated separately. This technique tends to reduce the reaction time as it affords better opportunity for contact between the reactants; it also tends to reduce the possibility of minute flaws in the coating.

Specific conditions which have been found to produce satisfactory coatings, are described in the following examples.

Example 1

A solution of solid polystyrene in a solvent consisting of equal parts by volume of toluene and benzene was prepared, the solution was applied to a test strip of steel and the solvent allowed to evaporate to leave a film of about 0.005 gram of polystyrene per square inch of metal surface. The treated strip was placed in a metal bomb type container and the container was evacuated. About one atmosphere of nitrogen and one atmosphere of fluorine were admitted into the container which was then permitted to stand in a room at about 25° C. for about 100 hours. The coated strip was then removed from the container.

Example 2

A solution of solid polystyrene in carbon tetrachloride was prepared, applied to a test strip of copper, and the solvent allowed to evaporate to leave a film of the same weight per unit area as in Example 1. The treated strip was placed in a conventional gas flow apparatus, in good heat transfer relation with flowing water at about 25° C. Dilute fluorine, e. g., a mixture of 50% fluorine and 50% nitrogen, was passed continuously over the treated strip for about one hour and then 100% fluorine was passed for about 8 hours. The total gas pressure in the apparatus was about one atmosphere. After this treatment the coated strip was removed from the apparatus.

The coatings of Examples 1 and 2 were markedly different in physical and chemical properties from the polymer films from which they were made. The coatings showed increased softening and melting points and decreased solubility in organic solvents; they also adhered firmly to the metal. They were tested by exposure to substantially 100% uranium hexafluoride gas for a continuous period of about 68 hours and remained substantially unchanged as compared with polystyrene films which were seriously corroded by the same treatment.

Satisfactory coatings were also obtained by forming a film of polyperfluorobutadiene on steel and a film of "Buna-N" on copper and treating the film in each case with fluorine, under conditions similar to those described in Example 1.

One interesting application of the present invention is in the field of electron microscopy. Studies may be made, by means of the electron microscope, of the size of dust particles in uranium hexafluoride in order to determine whether the particles are large enough to plug the pores of memberanes. It is the practice to provide a support for the dust particles which are admitted into the electron microscope chamber in a specimen of uranium heaxfluoride gas. The support should not react with the gas to produce another dust since this would interfere with the determination. Suitable supports, resistant to corrosion by the gas, were made as described in the following example.

*Example 3*

A 0.1% solution of a "Formvar" resin in ethylene dichloride was prepared. A glass slide was dipped into the solution, permitted to dry in air and the dried film was removed from the slide by contacting it with water. The thicknesse of the film was approximately 200 Angstrom units. A plurality of 200 mesh nickel plated copper screens, each in the form of a disk about ⅛ inch in diameter, were each covered with a portion of the film and placed in a bomb type container. The container was evacuated, filled with 100% fluorine and the materials were permitted to react for 24 hours at 60° C. under a fluorine gas pressure of ⅕ of an atmosphere. The coated screens so produced were used successfully for the purpose indicated.

Since many embodiments might be made of the present invention and since many changes might be made in the embodiment described, it is to be understood that the foregoing description is to be interpreted as illustrative only and not in a limiting sense.

We claim:

1. The method of treating a metal structure which comprises forming thereon a film of polyperfluorobutadiene and treating the film in situ with fluorine to produce an adherent coating resistant to corrosion by halogens and metal halides.

2. The method of treating a metal structure which comprises applying thereto a film of a polymerized fluorine containing unsaturated aliphatic compound and treating the film in situ with fluorine to produce an adherent coating resistant to corrosion by halogens and metal halides.

3. The method of treating a metal structure which comprises applying thereto a film of an unsaturated polymerized fluorine containing unsaturated aliphatic compound and treating the film in situ with fluorine to produce an adherent coating resistant to corrosion by halogens and metal halides.

4. The method of treating a metal structure which comprises applying thereto a film of a polymerized perfluoro unsaturated aliphatic compound and treating the film in situ with fluorine to produce an adherent coating resistant to corrosion by halogens and metal halides.

5. The method of treating a metal structure which comprises applying thereto a film of a polymerized completely halogenated unsaturated aliphatic compound containing fluorine and treating the film in situ with fluorine to produce an adherent coating resistant to corrosion by halogens and metal halides.

6. The method of treating a metal structure which comprises applying thereto a film of a polyperhalodiolefin containing fluorine and treating the film in situ with fluorine to produce an adherent coating resistant to corrosion by halogens and metal halides.

7. The method of treating a metal structure which comprises applying thereto a film of a polyperfluorodiolefin and treating the film in situ with fluorine to produce an adherent coating resistant to corrosion by halogens and metal halides.

8. A metal structure firmly bonded to a coating obtained by applying a film of polyperfluorobutadiene to said structure and treating the film in situ with fluorine.

9. A metal structure firmly bonded to a coating obtained by applying a film of a polymerized fluorine-containing unsaturated aliphatic compound to said structure and treating the film in situ with fluorine.

10. A metal structure firmly bonded to a coating obtained by applying a film of unsaturated polymerized fluorine-containing unsaturated aliphatic compound to said structure and treating the film in situ with fluorine.

11. A metal structure firmly bonded to a coating obtained by applying a film of a polymerized perfluoro unsaturated aliphatic compound to said structure and treating the film in situ with fluorine.

12. A copper structure firmly bonded to a coating obtained by applying a film of polyperfluorobutadiene to said structure and treating the film in situ with fluorine.

13. A steel structure firmly bonded to a coating obtained by applying a film of polyperfluorobutadiene to said structure and treating the film in situ with fluorine.

14. A metal structure firmly bonded to a coating obtained by applying a film of a polymerized completely halogenated unsaturated aliphatic compound containing fluorine to said structure and treating the film in situ with fluorine.

References Cited in the file of this patent

UNITED STATES PATENTS

| Number | Name | Date |
|---|---|---|
| 2,129,289 | Soll | Sept. 6, 1938 |
| 2,186,917 | Gaylor | Jan. 9, 1940 |
| 2,191,495 | Nesset | Feb. 27, 1940 |
| 2,215,704 | Ladd et al. | Sept. 24, 1940 |
| 2,276,951 | Fisher | Mar. 17, 1942 |
| 2,403,200 | Weiss et al. | July 2, 1946 |